US009718255B2

(12) United States Patent
Berger

(10) Patent No.: US 9,718,255 B2
(45) Date of Patent: Aug. 1, 2017

(54) CORROSION-RESISTANT DIFFUSION COATINGS

(71) Applicant: Barson Composites Corporation, Old Bethpage, NY (US)

(72) Inventor: Charles Clifford Berger, New City, NY (US)

(73) Assignee: Barson Composites Corporation, Old Bethpage, NY (US)

( * ) Notice: Subject to any disclaimer, the term of this patent is extended or adjusted under 35 U.S.C. 154(b) by 958 days.

(21) Appl. No.: 13/667,471

(22) Filed: Nov. 2, 2012

(65) Prior Publication Data
US 2013/0115097 A1 May 9, 2013

Related U.S. Application Data

(60) Provisional application No. 61/555,213, filed on Nov. 3, 2011.

(51) Int. Cl.
*C23C 16/08* (2006.01)
*B32B 15/01* (2006.01)
(Continued)

(52) U.S. Cl.
CPC .............. *B32B 15/01* (2013.01); *C23C 10/38* (2013.01); *F01D 5/288* (2013.01); *F05D 2230/31* (2013.01); *Y10T 428/12847* (2015.01)

(58) Field of Classification Search
CPC .... F01D 5/288; F01D 25/007; F05D 2230/31; F05D 2230/314; F05D 2260/231;
(Continued)

(56) References Cited

U.S. PATENT DOCUMENTS 3,958,047 A * 5/1976 Baldi ................ B01J 35/04
252/1
4,041,196 A * 8/1977 Baldi ................ B01J 35/04
118/717
(Continued)

FOREIGN PATENT DOCUMENTS

EP 1079073 B1 3/2010
KR 1020010019769 A 3/2001

OTHER PUBLICATIONS

International Search Report for application No. PCT/US2012/063287, dated May 14, 2013, 3 pages.
(Continued)

*Primary Examiner* — Richard Edgar
*Assistant Examiner* — Jesse Prager
(74) *Attorney, Agent, or Firm* — Reising Ethington P.C.

(57) ABSTRACT

A metal article such as a gas turbine component may include a super-diffusion coating with unusually high content of the desired constituent. The coating may be provided by combining two or more diffusion coating processes, each process interdiffusing the desired constituent with the metal article from a different metal source. The metal article can be placed in physical contact with a metal source in powder form as a first source, and the article can also be exposed an additional metal vapor source. Super-chromide coatings can be produced with alpha-chrome content in a manner that also provides the coating with sufficient ductility for long-term durability. For example, a shank portion of a gas turbine blade may be provided with a chromide coating with at least a portion of the coating having from 60-90% chromium content.

15 Claims, 2 Drawing Sheets

(51) Int. Cl.
*F01D 5/14* (2006.01)
*F01D 5/28* (2006.01)
*C23C 10/38* (2006.01)

(58) Field of Classification Search
CPC ..... F05D 2260/95; C23C 10/38; C23C 10/40; C23C 10/42; C23C 10/48; C23C 10/50; C23C 10/52; C23C 10/54; C23C 10/56; C23C 10/58
USPC .................................................. 427/252, 253
See application file for complete search history.

(56) References Cited

U.S. PATENT DOCUMENTS

| | | | |
|---|---|---|---|
| 4,528,215 A * | 7/1985 | Baldi | B01J 35/04 427/252 |
| 5,071,678 A * | 12/1991 | Grybowski | C23C 10/08 427/253 |
| 6,120,843 A * | 9/2000 | Pillhoefer | C23C 10/00 148/283 |
| 6,334,907 B1 | 1/2002 | Das et al. | |
| 6,989,174 B2 * | 1/2006 | Heng | C23C 10/08 427/237 |
| 2005/0265851 A1* | 12/2005 | Madhava | C23C 10/04 416/241 R |
| 2008/0245445 A1* | 10/2008 | Helmick | C23C 10/26 148/268 |
| 2009/0136664 A1 | 5/2009 | Minor | |
| 2009/0185912 A1 | 7/2009 | Walker et al. | |
| 2011/0058951 A1* | 3/2011 | Walter | F01D 5/288 416/241 R |
| 2011/0058952 A1* | 3/2011 | Pillhoefer | C23C 10/06 416/241 R |

OTHER PUBLICATIONS

Written Opinion for application No. PCT/US2012/063287, dated May 14, 2013, 7 pages.

* cited by examiner

CORROSION-RESISTANT DIFFUSION COATINGS

This application claims the benefit of U.S. Provisional Patent Application Ser. No. 61/555,213 filed Nov. 3, 2011, the entire contents of which are hereby incorporated by reference.

TECHNICAL FIELD

This disclosure generally relates to diffusion coatings for metal components and methods for applying diffusion coatings.

BACKGROUND

Certain metal components operate in a harsh environment that includes high temperatures, high mechanical stresses, and potentially reactive gases or other fluids. One type of component that must operate in such an environment is a combustion engine component, such as a gas turbine blade of a gas turbine engine or a piston of an internal combustion engine. The possible effects of this type of operating environment may be considered when selecting component materials. For example, material characteristics such as resistance to heat, stress, fatigue, corrosion, erosion, and/or oxidation may be considered. Material costs and manufacturability may be considered as well, along with numerous other factors.

SUMMARY

In accordance with one embodiment, a method of providing a diffusion coating over at least a portion of a metal article includes a powder contact process and a simultaneous vapor phase deposition process.

In accordance with another embodiment, a method of forming a diffusion chromide coating over a metal article includes the steps of: (a) interdiffusing chromium from a first source with at least a portion of the metal article; and (b) interdiffusing chromium from a second and different source with at least the same portion of the metal article so that the two interdiffusing steps together form a super-chromide coating having a chromium content of about 60 wt % or more in at least a portion of the coating.

In accordance with another embodiment, a gas turbine component includes a substrate and a super-chromide diffusion coating over only a portion of the substrate, at least a portion of the super-chromide diffusion coating having chromium content of 60 wt % or more.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION

The protective coatings described herein may be used on gas turbine blades or other gas turbine components such as compressor blades, turbine or compressor vanes, seals, rotors or hubs, shafts, or any other component that may be used in a combustion engine or other harsh environment. Coatings arranged, produced, or used as taught herein may protect underlying component materials from oxidation and other forms of corrosion. Moreover, the coating techniques disclosed below can provide coatings having unusually high concentrations of the desired coating constituents, thereby improving the service life of the component. These coatings may also be used in other non-turbine applications with metal components or articles that may operate under high stress conditions, at elevated temperatures, and/or in a corrosive environment. As used herein, the term "corrosion" is meant to include oxidation, sulfidation, volatilization, and other types of surface degradation.

Figure 1:
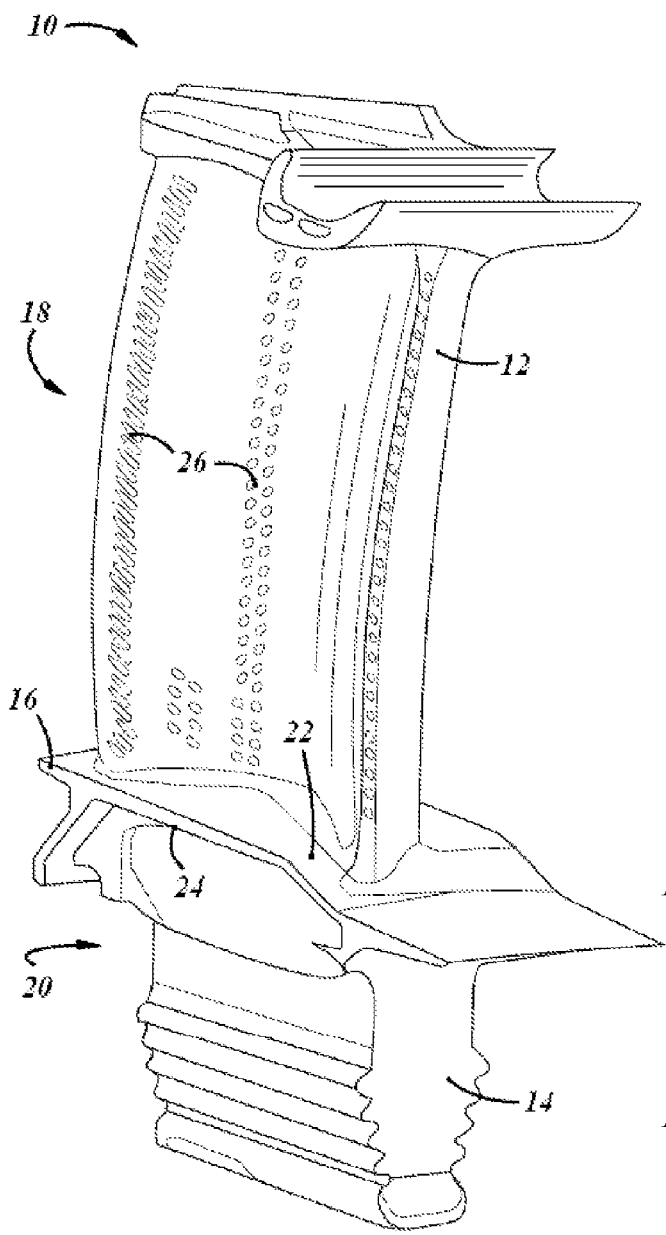
FIG. 1 shows an exemplary gas turbine component that may include the diffusion coating described herein.

Referring to FIG. 1, an exemplary gas turbine component is shown as an example of one type of metal article that the coatings and methods described below may be used with. In this embodiment, the component is a gas turbine blade 10. Turbine blade 10 includes an airfoil 12 and a shank 14, each extending from opposite sides of a platform 16. The airfoil 12 may include a cross-section or profile configured to cause high and low pressure regions on opposite sides thereof when placed in a particular orientation in a flowing fluid, thus causing the blade 10 to move in the direction of lower pressure. Shank 14 may be used as part of an attachment to secure the blade to a hub or other component that rotates about a central axis. Shank 14 may include several features not individually described here, such as a root, neck, ridges, sealing flanges, "angel wings," etc. In operation, multiple blades 10 may be arranged so that the airfoils extend radially away from the central axis of the hub to form a turbine that can transform energy from axial gas flow into rotational motion, or vice versa such as where the blade is used as part of a compressor.

Platform 16 lies between the airfoil 12 and shank 14, generally representing a boundary between an airfoil portion 18 of the blade that is exposed to combustion gases and a shank portion 20 of the blade that is constrained at one end and generally not exposed to combustion gases. The airfoil portion 18 includes the airfoil 12 and a topside 22 of the platform 16. The shank portion 20 includes an underside 24 of the platform 16 and any other blade components under the platform 16 or on the shank side of the platform 16. This configuration of turbine blade 10 may result in the shank portion 20 operating at temperatures lower than those at which the airfoil portion 18 operates. For example, shank portion 20 may operate at temperatures that range from about 1200-1600° F., while airfoil portion 18 may operate at higher temperatures that may range from about 1900-2100° F. In the illustrated embodiment, turbine blade 10 also includes internal cooling channels 26, the ends of some of which are shown along the airfoil surface. Channels 26 may extend from one or more surfaces of the shank portion 20 to one or more surfaces of the airfoil portion 18 to facilitate the flow of a cooling fluid, such as air, therethrough. Various blade cooling arrangements are known in the art, and the cooling channels may be omitted entirely in some cases.

Due to the earlier-described harsh environment in and around an operating gas turbine engine, engine components are sometimes constructed using superalloy materials that have high strength, ductility, and creep resistance at high temperatures, along with relatively high corrosion-resistance. Superalloy materials may be based on nickel (Ni), cobalt (Co), or Ni-Iron. Examples of superalloys include alloys available under the trade names Hastelloy, Inconel, and René, such as René N4, René N5 or others. While the corrosion-resistance of superalloys may generally be considered very good as metal alloys are concerned, the elevated temperatures and stresses, corrosive combustion gases, and other elements (e.g., atmospheric pollutants or particulates, fuel additives and impurities, salts, etc.) in a combustion engine operating environment can accelerate the corrosion of even the most corrosion-resistant superalloys.

Figure 2:
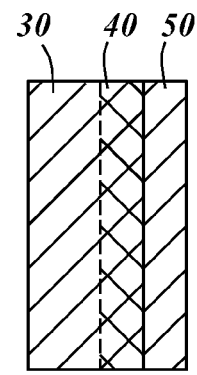
FIG. 2 is a cross-section of a portion of a metal article, including a diffusion coating and an overlay coating, according to one embodiment.

Various types of coatings or surface treatments have been developed in attempt to improve the corrosion-resistance of superalloy components in such environments. These coatings are generally categorized as either diffusion coatings or overlay coatings. FIG. 2 shows an example of a portion of a metal article 30 having both a diffusion coating 40 and an overlay coating 50. Both types of coatings are shown in FIG. 2 for illustration only, as either one or both types of coatings may be included with any given component. Both types of coatings may be at least partially interdiffused with an underlying material or substrate, but any interdiffusion that is present with an overlay coating is in the form of a relatively thin layer at the interface of the overlay coating and the underlying material. Overlay coating 50 may be an outer layer of material as shown and applied by processes such as electroplating, electroless plating, physical vapor deposition (PVD), thermal spraying, high velocity oxygen fuel spraying (HVOF), or low pressure plasma spraying (LPPS), for example, and may be included for protection of underlying material(s). For example, a ceramic-based material may be applied as an outer layer overlay coating to deflect heat and allow a component to operate at a lower temperature. Overlay coatings may be applied as intermediate layers as well, such as in bond coat layers to improve the adhesion of subsequently applied coating layers.

A diffusion coating has a substantial portion or all of its thickness interdiffused with the underlying material. The diffusion coating 40 of FIG. 2, for example, is shown with the cross-hatching depicting the underlying material 30 mixed together with reverse cross-hatching to indicate the interdiffusion of the applied diffusion coating 40 with the underlying material 30. In other words, a diffusion coating may not add thickness to the overall coated component in many cases. A diffusion coating is generally named for the element with which the substrate surface is enriched. By way of example, a chromide coating includes a layer of material that is more chromium-rich than the underlying material and further includes the constituent elements of the underlying material, due to the interdiffusion. Similarly, an aluminide coating includes a layer of material that is more aluminum-rich than the underlying material, and a platinum-aluminide (Pt-aluminide) coating includes a layer of material that is more rich in both platinum and aluminum than the underlying material. Due to their nature, multiple diffusion coatings may exist together at the surface of a component. For example, diffusion coating 40 of FIG. 2 may be a combination of chromide and Pt-aluminide coatings, and the depth of interdiffusion with the surface of the component can vary for each individually applied diffusion coating.

Diffusion coatings are generally applied by depositing the desired constituent element(s) onto the surface of the metal article and causing the element(s) to interdiffuse with the material at the surface of the article at elevated temperatures. The deposition and interdiffusion may be performed either simultaneously or separately. For example, a layer of metal such as chromium, aluminum, platinum, etc. may first be deposited over the surface of an article as an overlay coating by processes such as PVD, CVD, or plating at temperatures too low to cause interdiffusion of the coating with the underlying material. The coated article may then be heat treated at a temperature and time sufficient to cause the desired amount of interdiffusion of the coating with the underlying material. The coating material may diffuse into the surface of the underlying material, the underlying material may diffuse outwardly into the coating material, or the underlying material and the coating may diffuse toward each other. The term interdiffusion describes all of these modes of diffusion. Alternatively, diffusion coatings may be applied by processes that deposit the desired element(s) over the surface of the article being coated at a temperature sufficient to cause or allow interdiffusion at the same time the coating is being deposited. Examples of such processes include pack cementation and vapor phase deposition processes.

Pack cementation and vapor phase (or gas) deposition processes are chemically similar processes, with one difference between the processes being the location of the article being coated in relation to the coating material source. A pack cementation process generally includes packing a portion or all of an article to be coated in a powder bed that includes, usually in powder form, the constituent element(s) desired in the coating. The powder bed also includes an activator, such as a halide, and an optional inert filler material. For instance, a powder bed for use in the application of a chromide coating may include chromium powder, an ammonium chloride activator, and aluminum oxide as the inert filler. Other metal or semi-metallic elements may be included in the powder bed as well, and other activators and filler materials may be used, so long as they can function as described here. After packing, the powder bed is heated to a temperature that causes the activator to sublime and react with the coating element(s), in this case chromium. In this example, chromium chloride gas is produced by the activation reaction and migrates toward the portion of the component packed in the powder bed. Chromium metal is deposited on the component surface, and the chlorine (or other halogen) recombines with free ammonium in the powder bed to become available to activate more chromium. The activation temperature may be lower than the temperature necessary for interdiffusion, but the process can be carried out at the higher interdiffusion temperature to cause interdiffusion of the coating with the surface of the article being coated as the coating is deposited. Alternatively, post-heat treatment can be used for the interdiffusion step, or to complete the interdiffusion that was initiated during the coating deposition.

Vapor phase deposition is chemically similar to pack cementation, in that a halogenated compound of the desired coating material interacts with the surface of the article to be coated to deposit the coating. The halogenated compound is provided in vapor or gaseous form. In one version of vapor phase deposition, the article is supported over a material bed similar to the powder bed described above in connection with the pack cementation process. A material bed may include material in the form of powder, chips, nuggets, flakes, chunks, granules, beads, etc. or mixtures thereof—i.e., a powder bed is one type of material bed. The individual pieces of non-powder materials in a material bed can be pure elements such as chromium, alloys such as high chromium-content alloys that are mostly chromium, or plated materials such as aluminum-plated chromium nuggets where the intended coating material is aluminum. In one embodiment of a vapor phase deposition process, the metal article to be coated is supported above a material bed including the desired coating material, an activator, and an optional filler material. This arrangement may also be referred to as an "above the pack" process. In this embodiment, the material bed and article may then be heated in a manner similar to the powder bed of the pack cementation process to activate the material and cause the desired coating material from the material bed to be deposited and interdiffused with the surface of the article. Alternatively or additionally, gaseous halogenated chromium, aluminum, or other material can be produced outside of a vapor phase retort or other container in which the metal article is supported. The gas may be flowed or piped into the retort to deposit the coating on the article. For example, a carrier gas may flow through or over a bed of chromium or chrome-plated nuggets and activator outside the vapor phase retort container to carry halogenated chromium into the retort for chromium deposition. The carrier gas and/or the external bed may be heated to cause the activation reaction to produce the halogenated coating material. The carrier gas may include hydrogen, an inert gas such as argon, or any other gas that does not react with the coating material or the halogenated coating material. Other types of metal halide generators may be used as well.

As gas turbine and other combustion engines are developed to have higher efficiency or power output, operating temperatures generally increase. In some cases, the available coatings for gas turbine components may be insufficient to provide the desired protection from corrosion, particularly in portions of the components that are subjected to high stresses or fatigue. Described below are processes that can produce super-diffusion coatings and components that include such coatings. A super-diffusion coating is generally a diffusion coating having a higher content of the desired coating constituent than is normally possible to produce with known processes. For example, a super-chromide coating may be applied to a metal article, such as a gas turbine blade or other component, where the chromium content in at least a portion of the coating is about 60 wt % or higher. Such super-chromide coatings are thought to be particularly suitable where resistance to sulfidation is desired, such as in environments that include sulfur and/or sulfur-based compounds like $SO_x$, sulfuric acid, or sulfonic acid.

Figure 3:
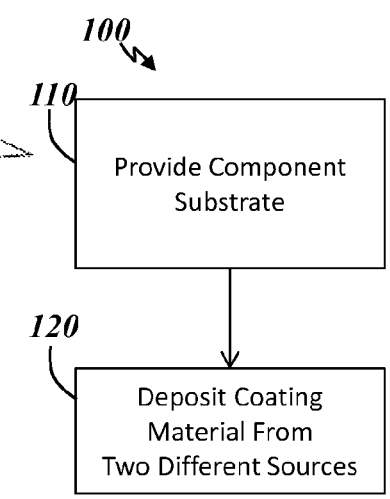
FIG. 3 is a flow chart depicting a process for providing a diffusion coating over a metal article, according to one embodiment.

Referring to FIG. 3, a diffusion coating process 100 is shown that generally includes the steps of providing a component substrate (step 110) and depositing coating material from two different sources (step 120). More specific examples will be provided below. A component substrate may include any type of metal article. In one embodiment, the metal article is a combustion engine component substrate, such as a gas turbine engine component substrate. One example of such a substrate is a gas turbine blade substrate, configured like the gas turbine blade of FIG. 1. The substrate material may be a superalloy, as previously mentioned, or any other suitable metal. The substrate may already have one or more coatings applied thereover. The two different sources indicated in step 110 may be described in several ways, such as two different locations, two different material beds, two different material phases, two different types of material, etc. as described in conjunction with the following illustrative embodiments. While the described examples of diffusion coating processes are capable of providing super-diffusion coatings, they do not have to be used for that purpose to be useful. For example, some embodiments may be useful to shorten typical diffusion coating process times.

In one embodiment, the diffusion coating process 100 includes providing a diffusion coating over at least a portion of a metal article, and step 120 includes a pack cementation process and a simultaneous vapor phase deposition process. This combined process can also be described as a pack cementation process with a vapor assist or a vapor boost, where the coating formed by each of the two simultaneous processes is the same type of coating, such as chromide, aluminide, or Pt-aluminide. In such cases, the same elemental metal is interdiffused with the metal article by each of the two processes. However, the simultaneous processes are also capable of providing two different diffusion coatings at the same time. For example, a chromide coating may be provided by the pack cementation process and an aluminide coating by the vapor phase process. The pack cementation process may include packing a powder bed around the portion of the metal article to be coated and heating the powder bed. Only a portion of the article may be packed in the powder bed, or the entire article can be packed in the powder bed. The powder bed includes a pack source metal, an activator, and may also include an inert filler material and/or other source metals. During heating, the pack source metal is activated with the activator and deposited over the packed portion of the metal article. In one embodiment, the pack source metal is chromium. In another embodiment, the pack source metal included in the powder bed is a single metal or an elemental metal, and the powder bed is substantially free from other materials that become part of the diffusion coating—i.e., the only material deposited as part of the resulting coating is an elemental metal such as chromium, aluminum, or platinum. In one embodiment, the powder bed may include from about 40% to about 80% pure chromium powder with the remainder of the powder bed being inert filler and/or activator materials.

The simultaneous vapor phase deposition process includes exposing the packed powder bed to a gaseous halogenated vapor source metal while the powder bed is heated as part of the pack cementation process, though this exposure may begin and/or end before, during, or after the heating of the powder bed. The term "vapor source metal" as used here is meant to describe a source of coating metal that is separate from the pack source metal and is eventually provided to the metal article in the form of a vapor, though the vapor source metal may originally be in solid form. The packed powder bed can be exposed to the halogenated vapor source metal in a number of ways, examples of which are best described with reference to FIGS. 4 and 5.

Figure 4:
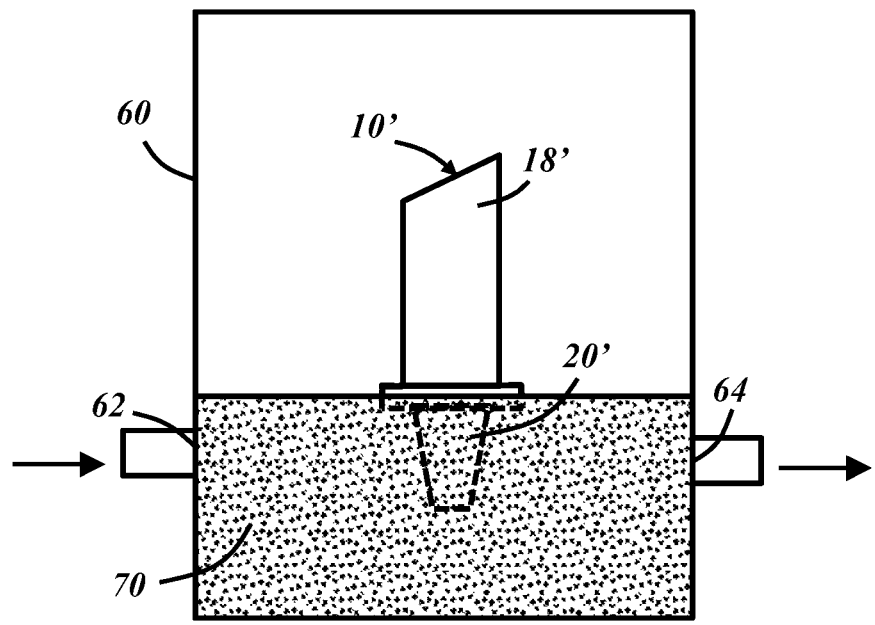
FIG. 4 is a schematic illustration of a gas turbine component during one embodiment of the coating process of FIG. 3, including active vapor assist.

FIG. 4 depicts an embodiment of the diffusion coating process that may be referred to as an active vapor-assist process, where vapor that includes the desired coating material, in gaseous and halogenated form, flows through the powder bed to increase the concentration of available coating material in the powder bed. In this embodiment, the metal article is a substrate 10' for a gas turbine blade, such as that shown in FIG. 1. The substrate 10' includes an airfoil portion 18' and a shank portion 20'. Powder bed 70 is packed around the shank portion 20' of the blade substrate 10' inside a vapor phase retort or other container 60, in this embodiment. Container 60 does not have to be a vapor phase retort, nor does it necessarily have to be closed-off as shown. The arrows in the figure show the flow direction of the gaseous halogenated metal to be deposited by the vapor phase process from an inlet side 62 to an outlet side 64 of the container 60. More specifically, in this embodiment, the flow of gaseous halogenated metal flows from inlet to outlet sides of the powder bed 70, which includes the pack metal source. The vapor phase gas can be provided from a pressurized source at the inlet side 62. Inlet and outlet sides 62, 64 need not be oriented as shown. For example, the inlet side may be located at the bottom and may include one or more inlet openings, and the outlet side of the powder bed 70 may be the top surface of the powder bed. The inlet and outlet sides may be anywhere that allows vapor flow through the powder bed for a vapor-assisted pack cementation process.

Figure 5:
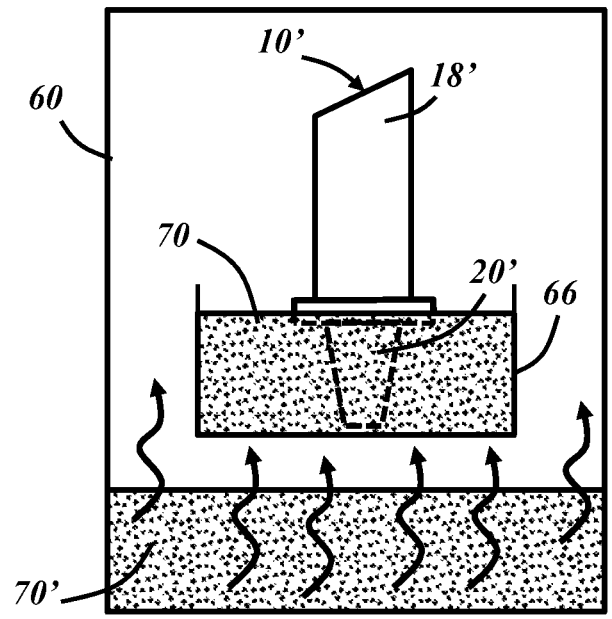
FIG. 5 is a schematic illustration of a gas turbine component during another embodiment of the coating process of FIG. 3, including passive vapor assist.

FIG. 5 depicts an embodiment of the diffusion coating process that may be referred to as a passive vapor-assist process, where vapor that includes the desired coating material is provided from an additional material bed 70'. In this embodiment, powder bed 70 is in a separate container 66 that is supported above the additional material bed 70' inside the vapor phase retort 60. The support structure for container 66 is omitted here, and can be of any variety so long as it allows gaseous fluid flow from material bed 70' to the powder bed 70 of container 66. Powder bed 70 is packed around the shank portion 20' of the blade substrate 10' in container 66, in this embodiment. The curved arrows in the figure depict halogenated metal vapor given off by the additional powder bed 70' inside the retort 60. The vapor can migrate through the powder bed 70 to reach the shank portion 20' of the substrate, while also depositing the metal coating material on the airfoil portion 18' of the substrate 10'. This embodiment of the diffusion coating process can result in a finished component having a super-diffusion coating, such as a super-chromide coating, over the portion of the component packed in powder bed 70, along with a lower coating metal-content diffusion coating over the portion of the component not packed in the powder bed 70. In this example, the resulting gas turbine blade may include a super-chromide coating at the shank portion and a lower chromium-content chromide coating at the airfoil portion.

These are of course only examples of process set-ups. In another embodiment, the two sources of coating material are both vapor phase sources, one of which is a material bed located in a retort where the metal article is supported above the material bed, and the other of which is an external source piped through the retort from an inlet side to an outlet side. Such a set-up may be described as a traditional vapor phase deposition process with an externally supplied vapor boost so that the coating metal concentration within the retort can be maintained at higher levels that is possible with traditional vapor phase processes having only a single source. In another embodiment, at least a portion of the metal article is packed in a powder bed and supported inside a vapor phase retort, and an externally supplied vapor boost is flowed into the retort, but not directly into the powder bed.

Another embodiment includes a slurry coating process. Slurry coating processes are similar to pack cementation in that the source metal is placed in physical contact with the article to be coated. Slurry coating processes and pack cementation processes may be grouped together under powder contact processes, for purposes of this disclosure. In a slurry process, a composition similar to a powder bed composition may be employed, including a mixture of the metal source or sources (e.g. chromium powder for chromide, aluminum powder for aluminide), an activator, a binder or filler material, and/or other optional constituents. The mixture is suspended in an aqueous or organic carrier liquid to form a slurry, which can be applied by dipping, selective spraying or other techniques. As the temperature is elevated to activation and/or diffusion temperature levels, the carrier liquid evaporates, and the remaining constituents of the slurry then behave as in pack cementation. Such a slurry process may be an additional different source of metal and/or metal vapor. For example, a slurry containing the desired source metal may be applied over at least a portion of the metal article, such as the shank portion and/or the airfoil portion of a turbine blade, and at least the slurry-coated portion of the article may be packed in a powder bed, subjected to an above-the-pack coating process, and/or subjected to a vapor phase process in which the slurry-coated article is placed inside a vapor retort into which a metal halide is flowed to provide a vapor boost and form a super-diffusion coating. In one particle example, a slurry including chromium metal is applied to the shank portion of the gas turbine blade and subjected to a vapor phase chromide process. For example, the slurry-coated shank portion may be placed in or over a powder bed comprising chromium powder or a bed comprising chromium nuggets or chromium-plated nuggets.

Where the metal coating materials from the two different sources or processes is the same metal, super-diffusion coatings may be applied to the metal article. A super-chromide coating applied using the above-described process may include chromium in an amount of 60 wt % or more. In particular, the diffusion coating may include anywhere from about 60 wt % to about 90 wt % chromium. In one embodiment, where the chromium content of the coating is above 60 wt %, alpha-chrome is present when the coating is formed over a Ni-based alloy. While alpha-chrome is typically not desirable in high stress applications due to its lower ductility, is has been found that the above-described coating process can produce chromide coatings with only small amounts of alpha-chrome so that its effect on the overall ductility of the coating is relatively insignificant. More specifically, the alpha-chrome may be limited to the outermost portion of the coating thickness, and the super-diffusion coating may include chromium in a gamma-phase with one or more other metals such as iron. Thus, a super-chrome coating is available through use of the above-described process that has the superior corrosion resistance of alpha-chrome, but without the typically problematic brittleness or low fatigue strength of alpha-chrome. While not bound by theory, the underlying gamma-phase structure is thought to provide the overall coating with sufficient ductility by bridging or providing a transition region in the coating between the alpha-chrome and the underlying metal article. Field tests in gas-turbine applications have indicated that such super-chromide coatings have a higher corrosion-resistance, particularly sulfidation-resistance, while also having sufficient ductility and fatigue strength.

Typical chromide diffusion coatings produced from only one source (e.g., only "in the pack" or "above the pack") include only about 20-30 wt % of chromium and are usually about 0.0006-0.001 inches thick. The super-chromide coatings describe here may range from about 0.001 inches to about 0.003 inches, or from about 0.001 inches to about 0.002 inches in some embodiments. In fact, super-chromide coatings have been produced in a range from 0.002 to 0.004 inches thick. The outermost portion of such coatings, from about 0.0005 to about 0.0015 inches, may have a chromium content from about 60% to about 90% and may be primarily alpha-phase chrome. The remaining portion of the chromide coating, from about 0.0005 to about 0.0035 may have a chromium content of less than 60%. In one embodiment, the outermost 0.001 to 0.0015 inches of the coating is primarily alpha-chrome, with the remaining underlying portion of the coating having only 20-60% chrome and being about 0.001 to 0.002 thick.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing a diffusion coating over a gas turbine blade substrate, the method comprising a powder contact process and a simultaneous vapor phase deposition process, wherein the powder contact process comprises the step of placing a shank portion of the gas turbine blade substrate in physical contact with a metal source in solid form such that an airfoil portion of the gas turbine blade substrate is not in physical contact with the metal source in solid form, wherein the simultaneous vapor phase deposition process deposits a vapor source metal on the same portion of the substrate that is in physical contact with the solid form metal source.

2. The method of claim 1, wherein the shank portion of the gas turbine blade is packed in a powder bed comprising the metal source and the airfoil portion of the blade is not packed in the powder bed, and wherein the vapor phase deposition process comprises the step of flowing a gaseous halogenated vapor source metal through the packed powder bed from an inlet side of the packed powder bed to an outlet side of the packed powder bed.

3. The method of claim 2, wherein the metal source of the powder bed and the source metal of the halogenated vapor source metal both include the same elemental metal, said elemental metal being a constituent of the diffusion coating.

4. The method of claim 1, wherein the shank portion of the gas turbine blade is packed in a powder bed comprising the metal source and the airfoil portion of the blade is not packed in the powder bed.

5. The method of claim 1, wherein the vapor phase deposition process comprises the step of flowing a gaseous halogenated vapor source metal through a packed powder bed from an inlet side of the packed powder bed to an outlet side of the packed powder bed.

6. The method of claim 1, wherein the solid metal source and the vapor source metal both include the same elemental metal, said elemental metal being a constituent of the diffusion coating.

7. The method of claim 6, wherein said same elemental metal is chromium.

8. The method of claim 1, wherein the diffusion coating includes chromide, aluminide, Pt-aluminide, or any combination thereof.

9. The method of claim 1, wherein the diffusion coating is a super-diffusion coating having at least 60% chromium in at least a portion of the coating.

10. The method of claim 9, wherein said at least a portion of the coating is along the shank portion.

11. The method of claim 1, wherein the powder contact process comprises the step of coating a slurry over at least a portion of the substrate.

12. The method of claim 11, further comprising the step of placing the slurry-coated portion of the substrate in a powder bed comprising the solid form metal source.

13. The method of claim 11, further comprising the step of placing the slurry-coated portion of the substrate over a powder bed comprising vapor source metal.

14. The method of claim 1, wherein both the solid metal source and the vapor metal source comprise chromium metal and at least one of the sources is substantially free of additional coating constituents.

15. The method of claim 1, wherein chromium is deposited over both the shank portion and the airfoil portion so that both of said portions have a chromide diffusion coating, and only the shank portion has a super-chromide coating.

* * * * *